Patented July 10, 1945

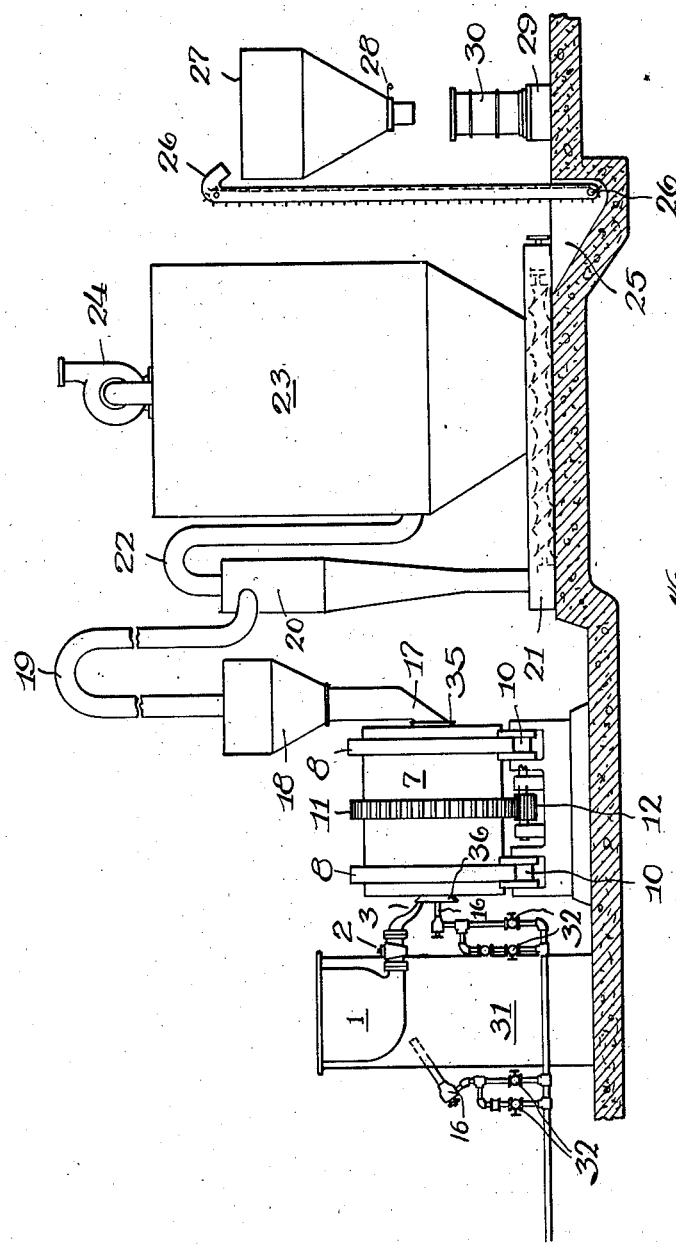

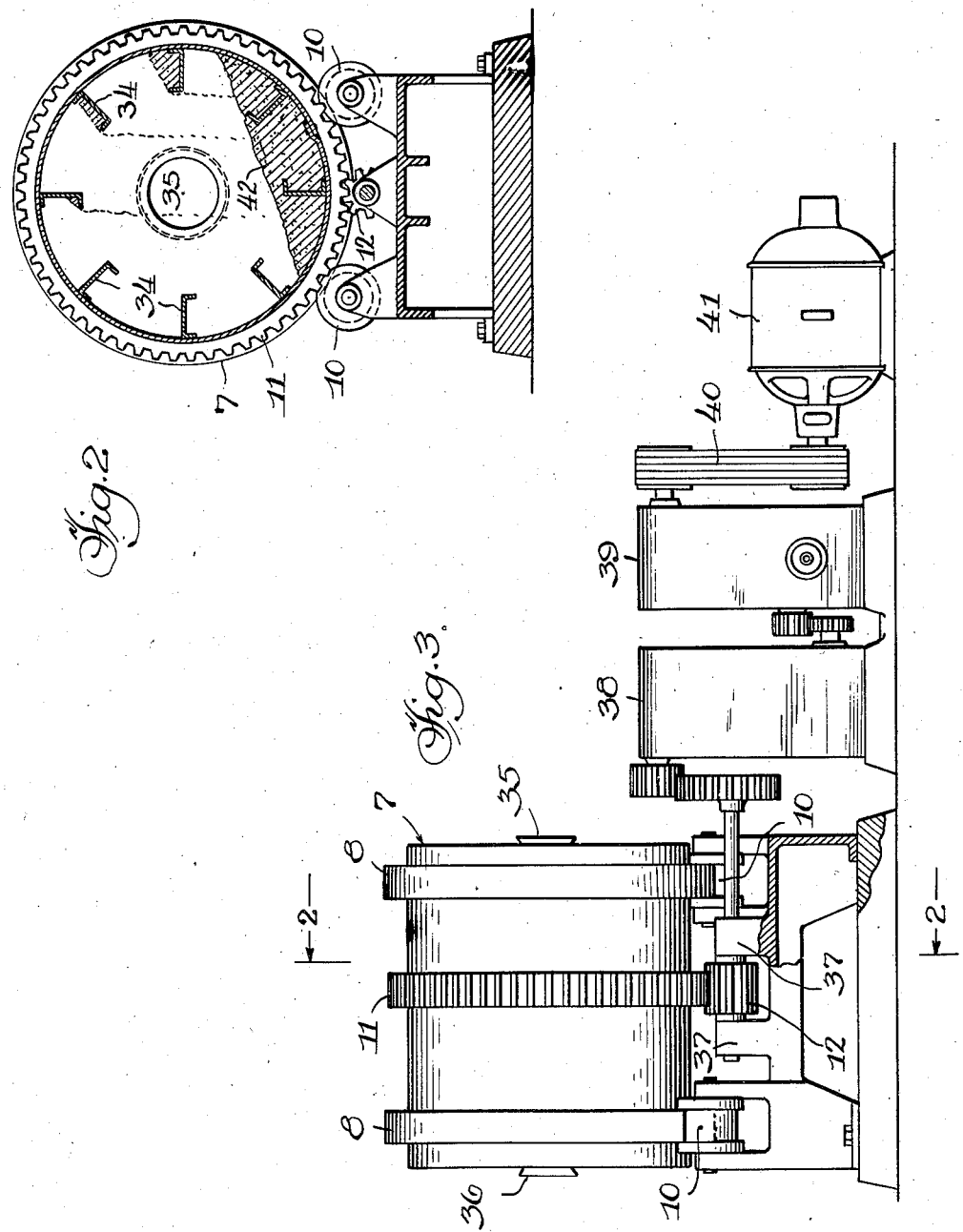

2,380,096

UNITED STATES PATENT OFFICE 2,380,096

MANUFACTURE OF LEAD OXIDE

Donald Jay Doan and Leonard Vaughn, Joplin, Mo., assignors to The Eagle-Picher Lead Company, Cincinnati, Ohio, a corporation of Ohio Application July 27, 1940, Serial No. 348,016

2 Claims. (Cl. 23—146)

This invention relates to the production of a new composition of matter comprising red modification litharge and metallic lead, free from contaminating red lead in injurious amounts, in a single, direct operation from lead, or lead bearing materials by a continuous method whereby we are enabled to produce our red modification litharge with a predetermined metallic lead content varying from 1% to 50% and having controlled predetermined particle size and particle size distribution.

The completion of a chemical reaction is dependent in large part upon the mass of the reacting ingredients, the size of the reacting particles and their proximity to one another, the temperature and the time of exposure to reaction temperature. Generally speaking, mass and size and proximity of particles are susceptible of satisfactory control. It is recognized that many reactions are favored by an increase in temperature, the higher the temperature the more complete the reaction in a definite time. Particularly in metallurgical procedures are temperature controls necessary or desirable, as in the production of metallic oxides from their metals and alloys.

In our research work on lead oxide, we have found that in the temperature range of approximately 621° F. to 675° F. and under the conditions of sub-division, intimate mixture and treatment herein described, molten lead is absorbed by lead monoxide forming a mixture of lead oxide and free metallic lead which is dry, dusty and easily ground while still hot. The molten metallic lead distributed in and through the mass of pulverulent lead monoxide is highly susceptible under controlled conditions to oxidation to red modification litharge containing free metallic lead. This distribution of the metallic lead in and through the lead monoxide increases the surface exposed to oxidizing gases and allows oxidation to proceed with great rapidity.

The practice of our invention contemplates a process to take advantage of the absorption of molten lead in lead monoxide and the easy grinding characteristics of the pulverulent mass to produce a finished red modification litharge having a predetermined metallic lead content, a predetermined particle size and particle size distribution in a single continuous operation of extreme simplicity. In carrying out our process we may use any suitable rotatable receptacle capable of holding molten lead and a mixture consisting of litharge and leady litharge and which can be operated to effect an agitation and mixing action simultaneously with the formation of red modification litharge and metallic lead in a heated oxidizing atmosphere within the temperature range to be specified.

One particular form of device suitable to our purpose is a rotatable drum revolving at the comparatively slow speed of one to ten revolutions per minute and equipped with lifters which serve to agitate and dust the litharge throughout the interior of the drum. Molten lead with a temperature of approximately 650° F. is added to the drum and dispersed or absorbed in the load without the formation of a lead bath. A small flame is provided at the entrance of the drum to furnish heat to the interior and an exhaust fan is used to draw the heat through the drum and withdraw red modification litharge with or without free metallic lead, from the drum to the collecting system. The process utilizes the principles of "slushing" or absorption of free metallic lead as one of its essential steps and requires rotation of the drum at such a speed as to secure a free pouring action of the pulverulent mass from the lifters, yet not fast enough to cause the mass to remain thrust against the walls by centrifugal force. Molten lead is fed into the drum at the flame opening in predetermined quantities which will exactly balance the amount of pulverized oxide drawn off by the air stream.

At a temperature of approximately 650° F. the mass of litharge, leady litharge and absorbed free metallic lead is highly pulverulent and readily broken down to an extremely fine powder. The rotation of the drum and particle friction serves to pulverize the material to the desired fineness. In pouring from the lifters this fine material is exposed to the air stream and swept out of the mill as formed in an amount corresponding to the amount of molten lead introduced at the opening.

The particle size of the red modification litharge is controlled by the velocity of the air stream through the mill together with a mechanical separator located in the air stream just outside the mill and so constructed that all oversize particles, beyond the range desired, are mechanically thrown out of the air stream and returned to the rotating drum. The process of attrition and separation of coarse particles is done at a temperature within which the material remains friable and easily broken down to the desired particle size. Beyond the mechanical separator, the processed material is carried by the air stream to any conventional separating device such a cyclones, bagrooms, Cottrell precipitator, etc.

The air velocity or amount of fresh air drawn through the drum not only controls the particle size of the material carried out, but also acts as a control on the free metallic lead content. The higher the air velocity the higher the free metallic lead content in the finished product. Further controls on the free metallic lead content consists in the speed of rotation of the drum and the temperature at which the material in the drum is maintained. To raise the free metallic lead content we lower the temperature toward 621° F. or lower the speed of the drum, or both, and this manipulation of either, or both, controls, together with control of the volume of air, gives precise control over the free metallic lead content.

A further important feature of our process resides in the milling or disintegration of the product at elevated temperatures. Due to the free pouring action of the pulverulent mass from the lifters the milling action is the result of attrition of the particles within the rotating drum and within the temperature range of 621° F. to 675° F., and any free metallic lead present is absorbed in the litharge in a molten condition. In this form the particles of litharge and metallic lead break down readily into particles of the desired size and at the same time maintain the red modification which seems to give the unusual properties indicated.

The device and apparatus generally referred to in the preceding paragraphs for carrying out the present process may take a form such as is shown in the drawings appended hereto, in which:

Figure 1 is a diagrammatic view of the apparatus as a whole, by which the present process may be carried out;

Fig. 2 is a sectional view taken on the line 2—2 of Fig. 3; and

Fig. 3 is a side elevational view of the drum illustrated in section in Fig. 2 and including usual driving means therefor.

In Fig. 1 apparatus for performing the process as a whole is shown and comprises a rotatable drum 7 charged initially with lead oxide. Pig lead is then melted in kettle 1 which is set in furnace 31. Lead kettle 1 is equipped with drainage valve 2 for controlling the flow of lead through pipe 3 into the drum. The temperature of the lead in the kettle 1 and the lead mass in the drum 7 may be regulated by suitable gas burners 16 and controlling means therefore designated generally by the valves 32. Drum 7 is supported on tires 8 running on trunnions 10 and is driven through ring gear 11 by pinion 12 as further shown in Figure 3. Fan 24 puts a positive draft on the entire discharge side of the system. By means of this draft, the finely powdered oxide is drawn up through throat 17 into sizing chamber 18. Oversize material is thrown out here and falls back into the drum, while the undersize or desired product is drawn up through cooling tube 19 and into cyclone separator 20. Here the majority of the product is thrown out of the air stream and falls into screw conveyor 21. Material too fine to be thrown out in cyclone 20 is drawn through trail pipe 22 into automatic bagroom 23 where it is filtered out of the air and also dropped into screw conveyor 21. From screw conveyor 21 the product is discharged into elevator pit 25 and lifted to storage hopper 27 by means of elevator 26. It is then packed into drums 30 on vibrator packer 29, the flow of oxide into the drum being controlled by slide gate 28.

Figure 2 is a cross section of the drum 7 supported on trunnions 10. The charge of partially oxidized leady material 42 is continuously agitated by means of channel iron lifters 34 which pick up the leady material and pour it down through the oxidizing atmosphere within the drum, thereby exposing it continuously to and in curtain form to the oxygen of the air, and also subdivide the material to the desired state through the attrition obtained by the rolling and falling action.

Figure 3 illustrates the drum drive wherein jack shaft and pinion 12 supported by bearings 37 is driven by motor 41 through variable speed controller 39 and speed reduction gear box 38.

In previous practice it has been customary to permit mixtures of molten lead and litharge to cool to room temperature and then mill over the conventional impact or ring roller mill. Upon cooling below its melting point the lead content solidified and the particles not only became difficult to mill, but were flattened or smashed out into thin flakes.

The product as such appears to be unique, manufactured in our usual way at temperatures between 621° F. and 675° F. Although our process may operate within this temperature range, the best operating results are achieved within the temperature range of 635° F. to 650° F. and with this latter range the temperatures are regarded as critical. By analysis we find it consists entirely of red modification litharge and free metallic lead. In those cases where red lead is present the amount is limited to less than 1%. The product tends to be highly uniform in particle size and distribution. The absolute particle size can be precisely controlled by the combination of air velocity and mechanical separator setting.

We prefer to control our product so that 60 to 80% is less than 3 microns in equivalent radius, with 40 to 60% of the product falling between 1 and 3 microns radius. The preferred particle size distribution curve is sharply skewed, peaking at 2 to 2.5 microns radius, with a specific radius 0.80 to 1.60 microns. Our process allows the product to be held within even more narrow limits than indicated above. We have, for example, held the product to 60 to 65% between 1 and 3 microns radius, with only 6 to 12% less than 1 micron radius, and then adjusted the controls and held the product at 50 to 55% between 1 and 3 microns, with 25 to 35% less than 1 micron. For special purposes, we may wish to produce a product of coarser particle size and by proper adjustment of our controls we can do so, maintaining the product in the predetermined size range.

As an example of oxides falling in our preferred range, we present the following table of particle size distribution:

| | Sample Ref. No. | | | | | | | | |
|---|---|---|---|---|---|---|---|---|---|
| | F546 | F552 | F554 | F564 | F573 | F575 | G563 | G564 | G565 |
| Apparent density | 18.3 | 19.6 | 20.4 | 21.5 | 21.1 | 22.7 | 16.0 | 18.0 | 16.2 |
| Acid absorption | 6.7 | 7.7 | 6.4 | 7.1 | 7.1 | 6.6 | 8.1 | 7.6 | 7.5 |
| Water absorption | 65 | 63 | 63 | 62 | 65 | 63 | 68 | 68 | 68 |
| Percent free lead | 19.6 | 20.0 | 20.8 | 12.0 | 14.4 | 14.8 | 4.0 | 4.8 | 3.2 |

| Equivalent radius (microns) | Percentage distribution by weight | | | | | | | | |
|---|---|---|---|---|---|---|---|---|---|
| Less than .5 | 13.5 | 12.0 | 10.4 | 7.8 | 9.6 | 7.2 | 1.8 | 1.0 | 1.1 |
| .5 to 1.0 | 20.6 | 19.7 | 17.9 | 14.6 | 15.8 | 12.9 | 9.6 | 5.0 | 6.0 |
| 1 to 2 | 33.5 | 36.0 | 30.8 | 28.9 | 32.6 | 27.0 | 34.0 | 23.4 | 34.7 |
| 2 to 3 | 14.3 | 14.3 | 15.4 | 23.8 | 26.1 | 30.2 | 29.7 | 46.4 | 29.7 |
| 3 to 4 | 3.6 | 3.4 | 3.4 | 8.0 | 6.6 | 8.2 | 6.7 | 10.6 | 9.0 |
| 4 to 5 | 2.8 | 2.3 | 3.8 | 4.5 | 2.9 | 2.8 | 3.4 | 4.2 | 2.6 |
| 5 to 6 | 2.2 | 2.1 | 1.7 | 1.8 | 1.4 | 1.8 | 2.2 | 2.8 | 2.6 |
| 6 to 8 | 4.0 | 2.0 | 3.4 | 3.3 | 2.2 | 1.1 | 2.7 | 2.0 | 2.6 |
| 8 to 10 | 2.6 | 3.2 | 2.4 | 2.1 | .6 | 2.8 | 2.8 | 1.2 | 1.7 |
| 10 to 15 | 1.8 | 3.6 | 3.6 | 2.0 | 1.0 | 2.9 | 2.4 | .8 | 4.8 |
| 15 to 20 | 1.2 | 1.2 | 3.6 | 1.4 | 1.3 | 1.4 | 3.2 | 1.2 | 2.2 |
| Greater than 20 | | | 3.3 | 1.9 | | 1.8 | 1.4 | 1.6 | 2.9 |
| Specific radius | 1.06 | 1.09 | 1.13 | 1.44 | 1.17 | 1.39 | 0.92 | 1.19 | 1.00 |

When used in storage batteries our product has shown properties heretofore unknown using the leady litharges made by any batch or semi-continuous process, and given a final milling over an impact or similar mill. When used in negative plates the formation thereof is accelerated within the same percentage as the free metallic lead present in the oxide, as compared with widely varying results when leady litharge is milled cold. When used in positive plates the formation is relatively slow, and comparatively the same as required for pure yellow modification litharge. Since red modification litharge normally converts to lead peroxide very rapidly, this slow formation is therefore a unique property for red modification litharge.

The lead acid storage battery plates prepared by conventional processes from our red modification litharge containing up to 20% free metal show very high initial capacity and at the same time yield exceptional life tests on the standard SAE life test. Special processes of formation are required in positive plates which contain more than 20% free metallic lead, and when so used give a plate having long life and high capacity.

Although we have given a detailed description of our process, it is to be understood the same is susceptible of modification and change and comprehends other details, and arrangement of parts, it being our intention to cover any variation or departure therefrom which conforms to the spirit of the invention and is intended to be included within the scope of the claims.

This application is a continuation in part of our application serial number 249,781 filed January 7, 1939.

Having thus disclosed our invention what we claim as new and desire to secure by Letters Patent is:

1. The process of making red modification litharge which comprises placing a mass of dry pulverulent lead monoxide particles in a closed space, maintaining an oxidizing atmosphere at temperatures approximately 621° F. to 675° F. in said space, adding molten lead to said mass in said oxidizing atmosphere at a rate that the pulverulent and dry condition of the mass is maintained and the lead contacts and is absorbed by the surfaces of the lead monoxide particles, simultaneously subjecting said mass to agitation, attrition and oxidation in said atmosphere, and finally separating and recovering red modification litharge from the resultant material.

2. The process of making red modification litharge which comprises placing a mass of dry pulverulent lead monoxide particles in a closed space, maintaining an oxidizing air current in said space, adding molten lead to said mass in said oxidizing atmosphere, simultaneously subjecting said mass to agitation and attrition and to oxidation at temperatures of approximately 621° F. to 675° F., said lead being added to said mass at a rate that the pulverulent and dry condition of the resultant material is maintained so that the lead contacts and is absorbed by the surfaces of the lead monoxide particles, and finally separating and recovering red modified litharge from the material by said oxidizing air current.

DONALD JAY DOAN.
LEONARD VAUGHN.